(12) United States Patent
Toumpelis et al.

(10) Patent No.: US 10,674,310 B2
(45) Date of Patent: *Jun. 2, 2020

(54) MODIFYING A STREAMING MEDIA SERVICE FOR A MOBILE RADIO DEVICE

(71) Applicant: SPOTIFY AB, Stockholm (SE)

(72) Inventors: Nikolaos Toumpelis, Stockholm (SE); Lingyu Wang, Nacka (SE); Michael Becker, New York, NY (US); Shannon Cusick, New York, NY (US); Nicholas Konstantinidis, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,489

(22) Filed: Mar. 15, 2019

(65) Prior Publication Data

US 2019/0215649 A1 Jul. 11, 2019

Related U.S. Application Data

(63) Continuation of application No. 15/645,465, filed on Jul. 10, 2017, now Pat. No. 10,237,683.

(30) Foreign Application Priority Data

Aug. 19, 2016 (EP) .................................. 16184963

(51) Int. Cl.
*H04W 4/021* (2018.01)
*H04W 4/029* (2018.01)
(Continued)

(52) U.S. Cl.
CPC ......... *H04W 4/021* (2013.01); *H04L 65/1073* (2013.01); *H04L 65/4069* (2013.01);
(Continued)

(58) Field of Classification Search
CPC ..... H04W 4/021; H04W 4/025; H04W 4/027; H04W 4/029; H04W 4/90; H04L 67/16; H04L 67/10; H04L 67/18
See application file for complete search history.

(56) References Cited

U.S. PATENT DOCUMENTS

| 10,237,683 B2* | 3/2019 | Toumpelis ............ H04W 4/021 |
| 2011/0060652 A1 | 3/2011 | Morton |

(Continued)

FOREIGN PATENT DOCUMENTS

| EP | 3035273 A1 | 6/2016 |
| EP | 3285453 A1 | 2/2018 |
| EP | 3285453 B1 | 7/2018 |

OTHER PUBLICATIONS

Extended European Search Report for European Patent Application No. 16184963.3, dated Sep. 28, 2016, 11 pages.

(Continued)

*Primary Examiner* — Diane D Mizrahi
(74) *Attorney, Agent, or Firm* — Tucker Ellis LLP

(57) ABSTRACT

A method performed in a network server system of a service provider providing a service comprising media streaming. The method comprises receiving a detection message from a mobile radio device running the service for a user registered with the service provider, wherein the message comprises an indication that the radio device has detected that it is within a predefined geographical area. The method also comprises determining that the predefined geographical area is registered with the service provider and associated with one or more actions. The method also comprises electing an action of the one or more actions. The method also comprises sending an instructions message to the radio device, comprising instructions to modify the service such that the radio device performs the elected action.

20 Claims, 2 Drawing Sheets

(51) Int. Cl.
*H04L 29/06* (2006.01)
*H04W 4/02* (2018.01)
*H04W 4/18* (2009.01)
*H04L 29/08* (2006.01)

(52) U.S. Cl.
CPC ......... *H04L 65/4084* (2013.01); *H04W 4/029* (2018.02); *H04L 67/18* (2013.01); *H04W 4/02* (2013.01); *H04W 4/023* (2013.01); *H04W 4/18* (2013.01)

(56) References Cited

U.S. PATENT DOCUMENTS

| | | |
|---|---|---|
| 2012/0159542 A1 | 6/2012 | Minwalla |
| 2012/0196571 A1* | 8/2012 | Grkov ............... H04L 63/14 455/411 |
| 2014/0006161 A1 | 1/2014 | Jabara et al. |
| 2014/0113560 A1 | 4/2014 | Graube et al. |
| 2014/0282877 A1 | 9/2014 | Mahaffey et al. |
| 2014/0358685 A1 | 12/2014 | Want et al. |
| 2016/0182590 A1* | 6/2016 | Afzelius ............... H04W 4/21 709/219 |
| 2016/0337863 A1 | 11/2016 | Robinson et al. |
| 2017/0372055 A1 | 12/2017 | Robinson et al. |

OTHER PUBLICATIONS

Apple Search Ads, How It Works—Apple Search Ads Advanced, retrieved from https://searchads.apple.com/advanced/ on Jan. 13, 2020, 9 pages.

Lee, June; "Enhance Your Customer Experience with Real-Time Location Services for Alexa Skills", Alexa Blogs, published Dec. 13, 2018, retrieved from https://developer.amazon.com/blogs/alexa/post/f23d0796-6c98-40d4-b499-e198b347a998/location-services-launch on Jan. 13, 2020, 4 pages.

Peoples, Glenn; "Understanding Personalized Audio Ads on Pandora and How They're a Game Changer for Music (and Other) Marketers", Pandora, retrieved from https://www.hypebot.com/hypebot/2017/03/how-to-reach-a-southern-mom-listening-to-country-music-on-pandora-after-driving-the-kids-to-school-o.html on Jan. 13, 2020, 5 pages.

* cited by examiner

MODIFYING A STREAMING MEDIA SERVICE FOR A MOBILE RADIO DEVICE

CLAIM OF PRIORITY

This application is a continuation of, and claims the benefit of priority to, U.S. patent application Ser. No. 15/645,465, titled "MODIFYING A STREAMING MEDIA SERVICE FOR A MOBILE RADIO DEVICE", filed Jul. 10, 2017, which application claims the benefit of priority under 35 U.S.C. 119 to European Patent Application No. EP16184963.3, titled "MODIFYING A STREAMING MEDIA SERVICE FOR A MOBILE RADIO DEVICE", filed Aug. 19, 2016; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure relates to methods and devices for modifying a streaming media service for a mobile radio device.

BACKGROUND

Radio terminals such as smartphones have data connectivity via Wi-Fi and cellular radio networks and may thus obtain services from service providers over the Internet. For instance, services may provide streaming media such as music or movies. Such services may be at least partly financed by bought advertisement. Such advertisement may be country specific, e.g. as identified via the IP address of the terminal, but it may be desirable to further tailor the advertisement based on the location of the terminal.

SUMMARY

It is an objective of the present invention to provide a method for improving how to modify a streaming media service to a radio device based on the location of the radio device, e.g. to provide location based information to a user of the service provided by the service provider.

In accordance with the present disclosure, this is achieved by having at least one, typically a plurality of, predefined and adequately limited geographical areas which are registered with the service provider and having the radio device running the service report to the service provider when it detects that it is within one of said predefined geographical areas. The service provider may then act accordingly to e.g. provide the location based information, e.g. advertisement.

Some aspects of the present invention are defined below.

According to an aspect of the present invention, there is provided a method performed in a network server system of a service provider providing a service comprising media streaming. The method comprises receiving a detection message from a mobile radio device running the service for a user registered with the service provider, said message comprising an indication that said radio device has detected that it is within a predefined geographical area. The method also comprises determining that the predefined geographical area is registered with the service provider and associated with one or more actions. The method also comprises electing an action of the one or more actions. The method also comprises sending an instructions message to the radio device, said message comprising instructions to modify the service such that the radio device performs the elected action.

According to another aspect of the present invention, there is provided a method performed in a mobile radio device running a service comprising media streaming provided by a service provider. The method comprises detecting that the radio device is within a predefined geographical area. The method also comprises automatically sending a detection message over a radio interface to a network server system of the service provider, said message comprising an indication that the radio device has detected that it is within the predefined geographical area. The method also comprises receiving an instructions message from the network server system, said message comprising instructions to modify the service to perform an action elected by the server system. The method also comprises modifying the service in accordance with the received instructions such that the radio device performs the elected action.

According to another aspect of the present invention, there is provided a computer program product comprising computer-executable components for causing a processing device, e.g. an embodiment of the radio device or network server system of the present disclosure, to perform an embodiment of a method of the present disclosure when the computer-executable components are run on processor circuitry comprised in the processing device.

According to another aspect of the present invention, there is provided a network server system for a service provider providing a service comprising media streaming. The server system comprises processor circuitry, and a storage unit storing instructions executable by said processor circuitry whereby said server system is operative to receive a detection message from a mobile radio device running the service, said message comprising an indication that said radio device has detected that it is within a predefined geographical area. The server system is also operative to determine that the predefined geographical area is registered with the service provider and associated with one or more actions. The server system is also operative to elect an action of the one or more actions. The server system is also operative to send an instructions message to the radio device, said message comprising instructions to modify the service such that the radio device performs the elected action.

According to another aspect of the present invention, there is provided a mobile radio device configured for running a service comprising media streaming provided by a service provider. The radio device comprises processor circuitry, and a storage unit storing instructions executable by said processor circuitry whereby said radio device is operative to detect that the radio device is within a predefined geographical area. The radio device is also operative to automatically send a detection message over a radio interface to a network server system of the service provider, said message comprising an indication that the radio device has detected that it is within the predefined geographical area. The radio device is also operative to receive an instructions message from the network server system, said message comprising instructions to modify the service to perform an action elected by the server system. The radio device is also operative to modify the service in accordance with the received instructions such that the radio device performs the elected action.

According to another aspect of the present invention, there is provided a computer program for a network server system of a service provider providing a service comprising media streaming. The computer program comprises computer program code which is able to, when run on processor circuitry of the server system, cause the server system to receive a detection message from a mobile radio device running the service, said message comprising an indication that said radio device has detected that it is within a predefined geographical area. The code is also able to cause the server system to determine that the predefined geographical area is registered with the service provider and associated with one or more actions. The code is also able to cause the server system to elect an action of the one or more actions. The code is also able to cause the server system to send an instructions message to the radio device, said message comprising instructions to modify the service such that the radio device performs the elected action.

According to another aspect of the present invention, there is provided an application software for enabling a mobile radio device to run a service comprising media streaming provided by a service provider. The application software comprises computer program code which is able to, when run on processor circuitry of the radio device, cause the radio device to detect that the radio device is within a predefined geographical area. The code is also able to cause the radio device to automatically send a detection message over a radio interface to a network server system of the service provider, said message comprising an indication that the radio device is within the predefined geographical area. The code is also able to cause the radio device to modify the service in accordance with instructions received in an instructions message from the network server system, said message comprising instructions to perform an action elected by the server system, such that the radio device performs the elected action.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
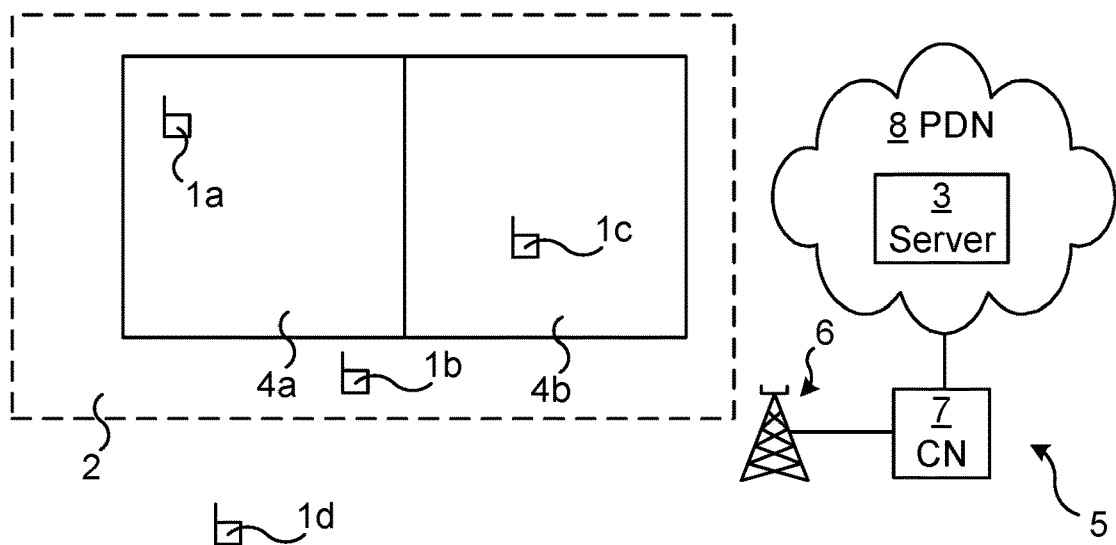
FIG. 1 is a schematic block diagram of a communication system in accordance with embodiments of the present invention.

FIG. 1 illustrates some example embodiments of the present invention. A plurality of mobile radio devices 1 are running application software, i.e. an app, for streaming media provided by/via a service provider which in the figure is represented by the network server or server system 3. The server system 3 may comprise one or several servers, databases and/or the like of the service provider for providing the service. The service provider may also have further servers in addition to the server system 3. In FIG. 1, four radio devices 1 are shown (1a, 1b, 1c and 1d) as an example for illustrating the present invention. One or a plurality of predefined geographical areas 4, e.g. corresponding to a store or a vicinity of a store, are present. In the figure, two such predefined geographical areas 4a and 4b are shown as an example. An area, e.g. store, 4a may also have a media playing device running application software for streaming media e.g. for playing in-store music through speakers comprised in the media playing device. Such a device may be a mobile or stationary device, and a wired or wireless device, e.g. a mobile radio device or a stationary wired device such as a computer with Ethernet access. The media playing device may use the same network server system 3 or service as the radio device(s) 1. A large store 4 may have multiple media playing devices in different departments.

The mobile radio devices 1 may be any devices able to communicate over a radio interface, typical examples include a smartphone or a tablet, or any other mobile media player. The radio device 1 may use any radio communication standard to connect to the server system 3 of the service provider, e.g. a wireless local area network (WLAN) or a cellular network, typically in accordance with a Third Generation Partnership Project (3GPP) standard. In the figure, the radio devices 1 have connectivity via a cellular radio communication network 5 comprising a radio access network (RAN) 6 and a core network (CN) 7 which provides access to a packet data network (PDN) 8, e.g. the Internet, via which the network server system 3 is accessible.

A person, e.g. a legal person such as a company, having an interest in a specific area, e.g. the owner of the store 4a, may want users of a radio device 1 running the service (e.g. by means of the app) to receive an advertisement for, or other information related to, the store/area when the radio device 1 is in proximity to it. The person may then buy such an advertisement from the service provider and request it to be associated with the area, which is then herein called a predefined geographical area. The predefined geographical area may be defined, e.g. by means of coordinates of its borders (for instance by means of a mathematical function) or as a distance (for instance within 50 meters) from a point defined by means of coordinates. The predefined geographical area is registered with the service provider, e.g. in the network server system 3 or a registration server or database of the service provider. Thus, the predefined geographical area 4 is registered with the service provider and associated with one or more actions, e.g. in the registration database, to be performed if a radio device 1 running the service of the service provider (typically by means of the app mentioned herein) gets inside the predefined geographical area. Such a predefined geographical area may also be associated with a media playing device as discussed above. The action may e.g. be to modify the media streaming to the radio device 1 of the service to include an advertisement e.g. information about products or special offers in the store of the predefined geographical area 4a, or provide a suitable playlist for the user to listen to while in the store. In an embodiment, such a suitable playlist may be the playlist that is being played by the in-store media playing device and the media stream to the mobile radio device 1 may then be synchronized to match the media stream to the media playing device. The action may be compulsory/pushed (silently) on the radio device 1, e.g. in a free version of the service, or it may only be a suggestion to the user of the radio device, e.g. in a premium version of the service.

The predefined geographical area may be associated with a plurality of actions which the service provider may elect between. The electing may e.g. be based on any of:

The location of the radio device 1 within the predefined geographical area, e.g. as determined by means of a positioning functionality in the radio device (for instance a Global Positioning System (GPS) function), The location of the predefined geographical area 4, which may be registered (typically as geographical coordinates) e.g. together with an identifier thereof in the server system 3 of the service provider, The distance between the radio device and a predefined point within the predefined geographical area, e.g. as determined by means of the positioning functionality in the radio device, The currently playing media stream for a media playing device associated with the predefined geographical area, The time of day or day of week, and/or Gender, age, habits in using the service and/or payment history of the registered user (which may be known by the service provider from the registration of the user and any payments made for the service by the user).

Thus actions (e.g. information/advertisement) tailored for the user may be provided by the service provider and executed by the radio device 1.

The four different radio devices 1 shown in FIG. 1 may all perform actions elected by the service provider (e.g. on behalf of the store owner of the store of the predefined geographical area 4a) due to their respective current geographical locations, but the action elected may be different for the different devices 1 in view of their different locations and/or the different service users having the different devices. For instance, radio device 1a which is within the predefined geographical area 4a may perform the action of providing (e.g. playing or displaying) information to the user about the store of the area 4a. The radio device 1b which is located outside of, but in the vicinity of, the predefined geographical area 4a (e.g. on the street outside the store which may be another predefined geographical area 4) may perform the action of providing general information about the store with the objective of peaking the interest of the user, getting the user to enter the store. The radio device 1c which is in the neighbouring predefined geographical area 4b, e.g. corresponding to a neighbouring store, may perform the action of providing information intended to make the user want to visit also the store of the geographical area 4a. All the radio devices 4a, 4b and 4c are within the same geographical region 2. The geographical region 2 may for instance correspond to a shopping area, a city, or a country or part thereof. In contrast, the radio device 1d is not located within the region 2, why it may perform the action of providing information to make the user interested in shopping, generally or specifically at the store of the predefined geographical area 4a.

Each of the radio devices 1 running the service may be generally instructed by the service provider, e.g. via the app, to report (e.g. continuously or periodically) its geographical position, whereby the service provider may check whether the geographical position is in the vicinity of any registered predefined geographical area(s), e.g. whether the geographical position is within a region 2. If the service provider detects that the radio device is in the vicinity of predefined geographical area(s) which are registered with the service provider, e.g. that the radio device is within a geographical region 2, the service provider may instruct the radio device, e.g. via the service app therein, to search for the predefined geographical areas 4 and to report to the service provider if the radio device enters one of them. The service provider may e.g. provide the radio device (typically the app therein) with information about the predefined geographical areas to enable the radio device to determine whether it is within one of them. The information may comprise e.g. coordinates of each of the predefined geographical areas 4 and, possibly, a respective identifier associated with each of the predefined geographical areas. Thus, the service provider may instruct the radio device 1 to only search for predefined geographical areas in regions 2 where the service provider knows there is at least one registered predefined geographical area, thereby conserving power of the radio device.

The identifier may be any number or code which may, typically uniquely, identify the predefined geographical area. The radio device 1 may then, instead of sending the coordinates of its own position or of the predefined geographical area which it has detected that it is within, send the associated identifier to the service provider for easier identification of said detected predefined geographical area.

The radio device 1 is able to determine its own geographical position, in order to be able to detect whether it is within a predefined geographical area 4 and/or region 2. This positioning may be done by means of standard procedures in a cellular network and/or LAN which the radio device is connected to, but may typically additionally or alternatively be done by means of a built-in positioning unit e.g. for a satellite positioning system such as GPS.

Figure 2:
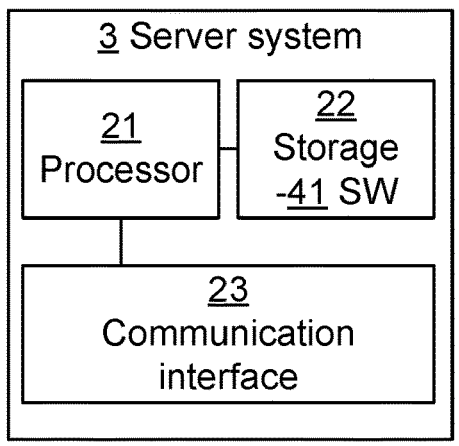
FIG. 2 is a schematic block diagram of an embodiment of a network server in accordance with the present invention.

FIG. 2 schematically illustrates an embodiment of a network server or server system 3 of the service provider of the present disclosure. The server system 3 comprises processor circuitry 21 e.g. a central processing unit (CPU). The processor circuitry 21 may comprise one or a plurality of processing units in the form of microprocessor(s). However, other suitable devices with computing capabilities could be comprised in the processor circuitry 21, e.g. an application specific integrated circuit (ASIC), a field programmable gate array (FPGA) or a complex programmable logic device (CPLD). The processor circuitry 21 is configured to run one or several computer program(s) or software (SW) 41 (see also FIG. 4) stored in a storage 22 of one or several storage unit(s) e.g. a memory. The storage unit is regarded as a computer readable means 42 (see FIG. 4) as discussed herein and may e.g. be in the form of a Random Access Memory (RAM), a Flash memory or other solid state memory, or a hard disk, or be a combination thereof. The processor circuitry 21 may also be configured to store data in the storage 22, as needed. The server system 3 also comprises a communication interface 23 for communicating with other nodes via the communication network, e.g. with a radio device 1 as discussed herein or with other servers of the service provider.

Figure 3:
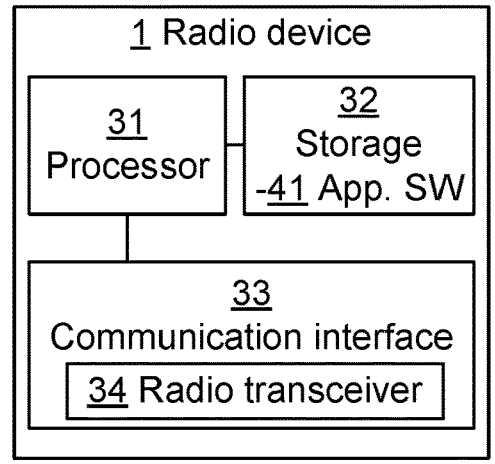
FIG. 3 is a schematic block diagram of an embodiment of a mobile radio device in accordance with the present invention.

FIG. 3 schematically illustrates an embodiment of a mobile radio device 1 of the present disclosure. The radio device 1 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software (SW) 41 (see also FIG. 4), e.g. an application software (app), stored in a storage 32 of one or several storage unit(s) e.g. a memory. The storage unit is regarded as a computer readable means 42 (see FIG. 4) as discussed herein and may e.g. be in the form of a Random Access Memory (RAM), a Flash memory or other solid state memory, or a hard disk, or be a combination thereof. The processor circuitry 31 may also be configured to store data in the storage 32, as needed. The radio device 1 also comprises a communication interface 33 having a radio transceiver 34 for radio communication with other nodes via the communication network, e.g. with a network server system 3 of the service provider via a RAN 6.

Figure 4:
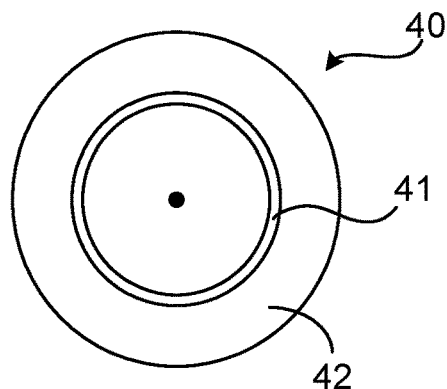
FIG. 4 is a schematic illustration of an embodiment of a computer program product in accordance with the present invention.

FIG. 4 illustrates a computer program product 40. The computer program product 40 comprises a computer readable (non-volatile) medium 42 comprising a computer program 41 in the form of computer-executable components 41. The computer program/computer-executable components 41 may be configured to cause a radio device 1 or network server system 3, e.g. as discussed herein, to perform an embodiment of a method of the present disclosure. The computer program/computer-executable components may be run on the processor circuitry 21/31 of the device/server for causing the device/server to perform the method. The computer program product 40 may e.g. be comprised in a storage unit or memory 22/32 comprised in the device 1 or server 3 and associated with the processor circuitry 21/31. Alternatively, the computer program product 40 may be, or be part of, a separate, e.g. mobile, storage means, such as a computer readable disc, e.g. CD or DVD or hard disc/drive, or a solid state storage medium, e.g. a RAM or Flash memory.

Figures 5, 6:
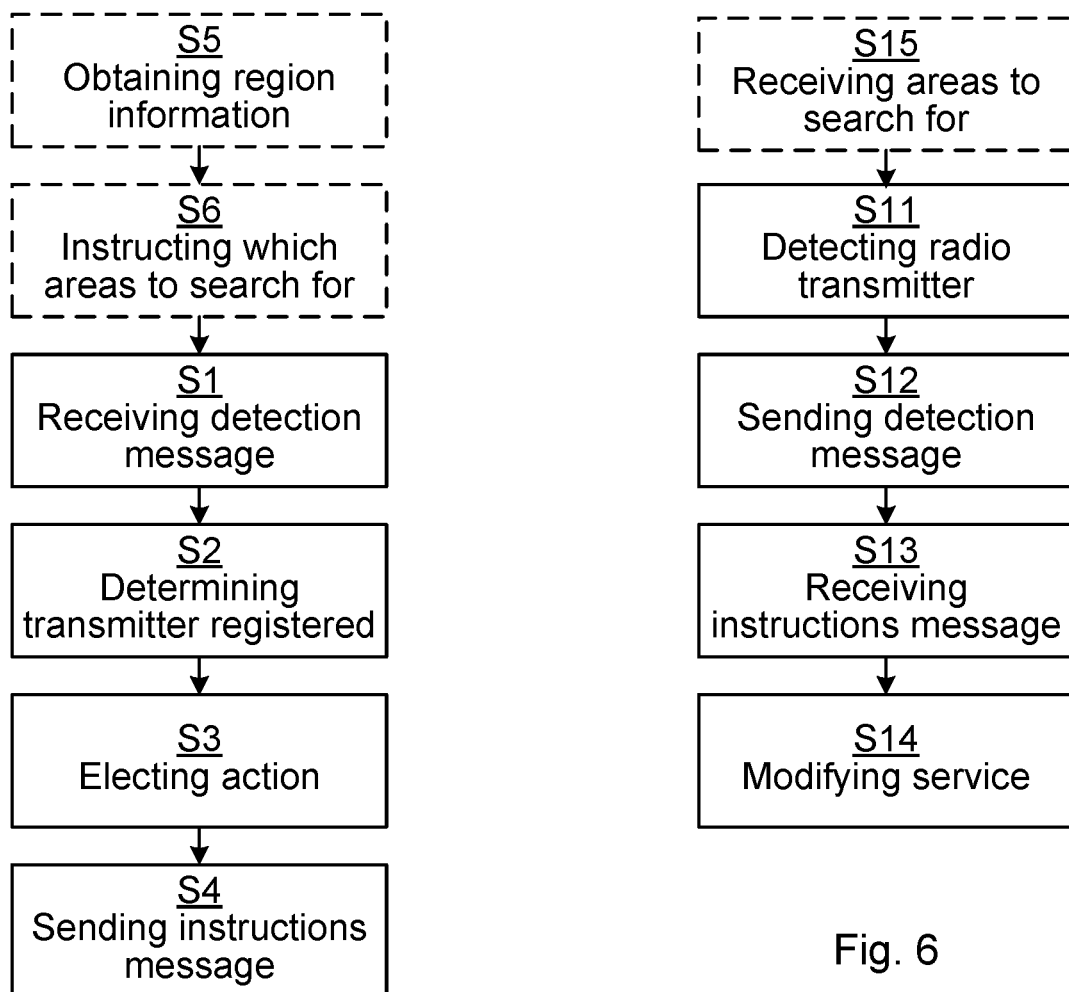
FIG. 5 is a schematic flow chart of embodiments of a method performed in a network server in accordance with the present invention.
FIG. 6 is a schematic flow chart of embodiments of a method performed in a mobile radio device in accordance with the present invention.

FIG. 5 is a schematic flow chart of some embodiments of a method performed in the network server 3 of a service provider providing a service comprising media streaming.

The server system 3 receives S1 a detection message from a mobile radio device 1 running the service for a user registered with the service provider, said message comprising an indication that said radio device has detected that it is within a predefined geographical area 4. The detection message may also comprise an identifier of the predefined geographical area. That the user is registered implies that the service provider knows the user and has some information about him/her e.g. gender, age, nationality, address, habits in using the service and/or payment history. The identifier may be any identifier enabling the service provider to determine whether the predefined geographical area is registered with the service provider, and if so, with which action(s) it is associated, typically an ID code.

Then, the server system 3 determines S2 that the predefined geographical area, as identified e.g. by a received identifier, is registered with the service provider and associated with one or more actions (e.g. advertisement or playlist as discussed herein). In some embodiments, the determining S2 also comprises obtaining geographical coordinates of a present location of the radio device within the predefined geographical area. The geographical coordinates or identifier may e.g. be registered together with the coordinates of the predefined geographical area in e.g. the network server system 3 or other server/database of the service provider. Thus, the determining S2 may, in some embodiments, comprise looking up the predefined geographical area in a database of predefined areas 4, in which each predefined geographical area is associated with respective one or more actions and, optionally, with an identifier for said predefined geographical area.

Then, the server system 3 elects S3 an action from the one or more actions. As discussed above the electing S3 may e.g. be based on any of: location of the radio device 1, location of the predefined geographical area 4, distance between the radio device and a predefined point within the predefined geographical area, a currently playing media stream for a media playing device associated with the predefined geographical area, time of day, day of week, and/or gender, age, nationality, address, habits in using the service and/or payment history of the registered user.

Then, the server system 3 sends S4 an instructions message to the radio device 1, said message comprising instructions to modify the service such that the radio device performs the elected S3 action.

Optionally, in some embodiments, the server system 3, prior to receiving S1 the detection message, obtains S5 information that the radio device 1 is within a specified geographical region 2. The server system may then, in some embodiments, instruct S6 the mobile radio device 1 to search for specified geographical area(s), comprising the predefined geographical area 4, within the specified geographical region 2, before the receiving S1 of the detection message. Thus, the detection message may also indicate that the detected predefined geographical area 4 has been detected within said specified geographical region 2. To save battery life of the radio device 1, the server system 3 may instruct the radio device to only search for predefined geographical areas 4 in a region 2 where the server system 3 knows that there is at least one predefined geographical area which is registered with the service provider.

FIG. 6 is a schematic flow chart of some embodiments of a method performed in the radio device 1 running a service comprising media streaming provided by the service provider. The radio device 1 is typically the same radio device as referred to above in respect of FIG. 5, why the discussion in respect of FIG. 5 is in applicable parts also relevant to FIG. 6.

The radio device 1 detects S11 that the radio device is within a predefined geographical area. In some embodiments, the detecting S11 comprises detecting the predefined geographical area 4 within a specified geographical region 2 in which the radio device 1 is instructed to search for specified geographical area(s) 4, comprising the predefined geographical area.

Then, the radio device 1 automatically sends S12 the detection message over a radio interface to a network server system 3 of the service provider, said message comprising an indication that the radio device 1 has detected that it is within the predefined geographical area 4. The detection message may also comprise other information, e.g. the geographical location (e.g. GPS coordinates) of the radio device 1 and/or the an identifier of the predefined geographical area. That the message is sent automatically implies that it does not require an action of the user to be sent. Typically, the application software of the service run in the radio device also includes the instructions to send S12 the detection message.

Then, the radio device 1 receives S13 the instructions message from the network server system 3, said message comprising instructions to modify the service to perform an action elected by the server.

Then, the radio device 1 modifies S14 the service in accordance with the received S13 instructions such that the radio device 1 performs the elected action. The instructions to modify the service may e.g. comprise instructions to stream media associated with the elected action, e.g. advertisement or media of a playlist as discussed herein.

Optionally, in some embodiments, the radio device 1 may, prior to detecting S11 the predefined geographical area 4, receive S15 instructions from the network server system 3 to search for the specified geographical area(s) within a specified geographical region 2, thus saving battery life of the radio device as previously discussed.

EXAMPLE

As a user moves short distances with the mobile radio device 1 (e.g. smartphone), the radio device (e.g. a service application, app, 41 thereon) periodically checks its own current location against a list of location coordinates or region coordinates, i.e. the predefined geographical areas 4. The list has typically been received from the network server system 3 and may include only areas 4 which are close to the radio device 1, based on information available to the network server system 3 about the current location of the radio device 1.

If the radio device 1 (e.g. the app therein) detects a match in the list for an area 4, it may trigger an associated action or set of actions that is defined for that area 4. The actions may be defined in the list already in the radio device, or it may receive instructions including the action(s) from the network server system 3 in response to a detection message sent thereto from the radio device.

When the user moves longer distances with the radio device 1, the radio device (e.g. a service application, app, thereon) may detect if there is a larger change of location. The radio device may then ask the network server system 3, by providing its new location, if its list needs to be updated with new area(s) 4 nearby the new location. The network server system may e.g. check a global list of predefined geographical areas and may send, to the radio device, the areas located close to the new location of the radio device. The radio device may then update its list of areas 4.

The present disclosure has mainly been described above with reference to a few embodiments. However, as is readily appreciated by a person skilled in the art, other embodiments than the ones disclosed above are equally possible within the scope of the present disclosure, as defined by the appended claims.

What is claimed is:

1. A method performed in a network server system of a service provider providing a service comprising media streaming, the method comprising:
   receiving a detection message from a mobile radio device running the service for a user registered with the service provider, said detection message comprising an indication that the radio device has detected that the radio device is within a predefined geographical area;
   determining that the predefined geographical area is registered with the service provider and associated with one or more actions;
   electing an action of the one or more actions; and
   sending an instructions message to the radio device, said instructions message comprising instructions to modify operation of the radio device used with the service including that the radio device performs the elected action.

2. The method of claim 1, wherein the detection message, as the indication, comprises an identifier associated with the registered geographical area.

3. The method of claim 1, wherein the electing is based on any of:
   location of the radio device, location of the predefined geographical area, distance between the radio device and a predefined point within the predefined geographical area, a currently playing media stream for a media playing device associated with the predefined geographical area, time of day, day of week, and/or gender, age, nationality, address, habits in using the service and/or payment history of the registered user.

4. The method of claim 1, further comprising:
   obtaining information that the radio device is within a specified geographical region; and
   instructing the mobile radio device to search for specified geographical area(s), comprising the predefined geographical area, within the specified geographical region, before the receiving of the detection message.

5. The method of claim 1, wherein the determining comprises looking up the predefined geographical area in a database of predefined areas, in which each predefined geographical area is associated with respective one or more actions and, optionally, with an identifier for said predefined geographical area.

6. The method of claim 1, wherein the instructions to modify operation of the radio device used with the service comprises instructions to stream media associated with the elected action, to at least one of play an advertisement or to provide a pre-prepared playlist.

7. The method of claim 1, wherein the radio device is running the service by means of a dedicated application software, which software is configured for automatically reporting any detection of the predefined geographical area to the network server system.

8. The method of claim 1, wherein the elected action includes modifying the media streaming to the radio device of the service to include an advertisement or other information describing products or offers associated with the predefined geographical area.

9. The method of claim 1, wherein each of one or more radio devices running the service are instructed by the service provider to report the radio device's geographical position, whereby the service provider checks whether the geographical position associated with radio device is in the vicinity of a registered predefined geographical area.

10. The method of claim 1, wherein the service provider provides each of one or more radio devices information describing predefined geographical areas which information the radio device uses to determine whether the radio device is within one of the predefined geographical areas.

11. A method performed in a mobile radio device running a service comprising media streaming provided by a service provider, the method comprising:
   detecting that the radio device is within a predefined geographical area;
   automatically sending a detection message over a radio interface to a network server system of the service provider, said detection message comprising an indication that the radio device has detected that the radio device is within the predefined geographical area;
   receiving an instructions message from the network server system, said instructions message comprising instructions to modify operation of the radio device used with the service to perform an action elected by the server system; and
   modifying operation of the radio device used with the service in accordance with the received instructions including that the radio device performs the elected action.

12. The method of claim 11, wherein the detecting comprises detecting the predefined geographical area within a specified geographical region in which the radio device is instructed to search for specified geographical area(s), comprising the predefined geographical area.

13. The method of claim 12, further comprising:
   receiving instructions from the network server system to search for the specified geographical area(s) within the specified geographical region, before the detecting of the predefined geographical area.

14. The method of claim 11, wherein the instructions to modify operation of the radio device used with the service comprises instructions to stream media associated with the elected action, to at least one of to play an advertisement or to provide a pre-prepared playlist.

15. The method of claim 11, wherein the radio device is running the service by means of a dedicated application software, which software is configured for automatically reporting any detection of the predefined geographical area to the network server system.

16. The method of claim 11, wherein the elected action includes modifying the media streaming to the radio device of the service to include an advertisement or other information describing products or offers associated with the predefined geographical area.

17. The method of claim 11, wherein each of one or more radio devices running the service are instructed by the service provider to report the radio device's geographical position, whereby the service provider checks whether the geographical position associated with radio device is in the vicinity of a registered predefined geographical area.

18. The method of claim 11, wherein the service provider provides each of one or more radio devices information describing predefined geographical areas which information the radio device uses to determine whether the radio device is within one of the predefined geographical areas.

19. A network server system for a service provider providing a service comprising media streaming, the server system comprising:
   processor circuitry; and
   a storage unit storing instructions executable by said processor circuitry whereby said server system is operative to:
      receive a detection message from a mobile radio device running the service, said detection message comprising an indication that the radio device has detected that the radio device is within a predefined geographical area;
      determine that the predefined geographical area is registered with the service provider and associated with one or more actions;
      elect an action of the one or more actions; and
      send an instructions message to the radio device, said instructions message comprising instructions to modify operation of the radio device used with the service including that the radio device performs the elected action.

20. A mobile radio device configured for running a service comprising media streaming provided by a service provider, the radio device comprising:
   processor circuitry; and
   a storage unit storing instructions executable by said processor circuitry whereby the radio device is operative to:
      detect that the radio device is within a predefined geographical area;
      automatically send a detection message over a radio interface to a network server system of the service provider, said detection message comprising an indication that the radio device has detected that the radio device is within the predefined geographical area;
      receive an instructions message from the network server system, said instructions message comprising instructions to modify operation of the radio device used with the service to perform an action elected by the server system; and
      modify operation of the radio device used with the service in accordance with the received instructions including that the radio device performs the elected action.

* * * * *